United States Patent Office 3,341,340
Patented Sept. 12, 1967

3,341,340
STABILIZED CLAY DISPERSIONS
Edgar W. Sawyer, Jr., and Walter L. Haden, Jr., Metuchen, N.J., assignors to Minerals & Chemicals Philipp Corporation, Woodbridge Township, N.J., a corporation of Maryland
No Drawing. Filed Jan. 6, 1966, Ser. No. 529,900
12 Claims. (Cl. 106—72)

ABSTRACT OF THE DISCLOSURE

Clay slips of the type used by the paper coating industry are formulated with kaolin clay, a sodium condensed phosphate dispersant such as tetrasodium pyrophosphate or sodium hexametaphosphate and a small amount of amino trimethyl phosphonic acid (or alkali metal salt thereof). The dispersed slips remain fluid for longer periods of time and are more stable at elevated temperature than they would be in the absence of the amino trimethyl phosphonic acid or salt. With spray dried predispersed clays, the amino trimethyl phosphonic acid or salt is incorporated with the clay and condensed phosphate dispersant before the clay is spray dried.

---

This invention relates to the stabilization of condensed phosphate dispersants and is directed especially to the stabilization of aqueous slips or slurries of clay which are dispersed with a condensed phosphate salt.

For many of their important uses, finely divided minerals such as clays must be supplied or utilized in the form of fluid aqueous dispersions. Various chemicals are capable of dispersing clays to some extent in aqueous liquids. The condensed phosphate salts, exemplified by sodium hexametaphosphate and tetrasodium pyrophosphate, are comparatively inexpensive and are very powerful dispersants. They disperse many mineral slurries to an extent that is not exceeded by other inexpensive dispersants. By way of example, the paper industry uses kaolin clay-water slips to produce clay-pigmented coatings on paper. These slips must be highly concentrated and usually contain about 70 parts by weight of kaolin to about 30 parts by weight water. Although highly concentrated, it is essential that these slips remain fluid during storage and handling so that they can be screened and handled in pumps and mixers. Tetrasodium pyrophosphate and sodium hexametaphosphate are successfully used to prepare these concentrated clay slips. Sodium silicate, a common dispersant, is not sufficiently powerful to maintain the clay slips fluid.

Another advantage of tetrasodium pyrophosphate and sodium hexametaphosphate is that they are effective over a relatively wide pH range, including pH values below 7. The pH of some dispersed mineral slurries, such as dispersed clay slips, tends to drift downward with time, probably as a result of adsorption or reaction of the mineral with alkali employed to adjust pH to a value optimum for dispersion. When condensed phosphate dispersants are used, dispersed clay-water systems remain fluid even when the pH drops to values approaching the natural pH of the clay. When some other dispersants are substituted for condensed phosphates, a drop in pH may result in flocculation of the clay and the clay-water system will no longer be in the required fluid state.

A limitation to the usefulness of condensed phosphate dispersants results, however, from the fact that these salts are polymeric in structure. The salts tend to depolymerize under certain conditions. Depolymerization results in the conversion of the dispersant to an orthophosphate or other phosphate salts which are relatively ineffective as dispersants. Instability is indicated by changes in the rheological properties of dispersed slurries, exemplified by an increase in viscosity and reduced screening rate. When this occurs, the thickened system may become useless. Degradation is especially likely to occur when the mineral slip is warm. This may occur when the slip is stored in a warm environment. It may also occur when the slip is agitated and/or pumped during storage in order to prevent settling. The problem is especially likely to occur when the slip is agitated during storage in a hot climate.

Accordingly, an object of this invention is to increase the usefulness of condensed phosphate salts as dispersants. A specific object is to improve the stability, especially the heat stability, of mineral slurries, particularly high solids clay-water slips, which are dispersed with condensed phosphate salts.

Another object is to stabilize clay-water slips in an economically feasible manner.

Still another object is to stabilize condensed phosphate dispersed slurries against the influence of time and heat without impairing the stability of the slurries over a wide pH range.

Briefly stated, in accordance with this invention, fluid aqueous mineral slurries which are dispersed with an alkali metal salt of a condensed phosphate are stabilized against the effects of time and heat by addition to the slurry of amino trimethyl phosphonic acid or a water-soluble alkali metal salt thereof. The structure of amino trimethyl phosphonic acid or nitrilo-tris(methylene) triphosphonic acid is shown below:

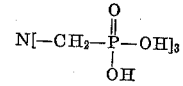

The addition of a small amount of amino trimethyl phosphonic acid or salt thereof to a condensed phosphate dispersed aqueous slip, in accordance with this invention, enhances the action of the phosphate dispersant by increasing the period during which the system remains fluid and thereby prolonging the useful life of the aqueous slip. The additive is especially useful in improving the stability of the slip at elevated temperature.

The present invention is especially adapted to the stabilization of high solids clay-water slips employed by the paper coating industry since, for reasons of economics and general performance, condensed phosphate salts are the preferred dispersants for such use. The invention will therefore be described as it applies to the stabilization of such slurries.

Fluid slurries or slips containing kaolin clay in amount of at least 50 percent by weight are benefited by the incorporation of amino trimethyl phosphonic acid or soluble alkali metal salts thereof, in accordance with this invention. The invention is especially applicable to the improvement of highly concentrated slips containing at least about 65 percent clay solids since viscosity buildup in these highly concentrated slips is especially troublesome. With most kaolins, the maximum clay solids of slips that are sufficiently fluid for practical use is about 72 percent. However, fluid dispersed slips containing up to about 78 percent clay solids can be formulated with processed kaolins. Exceptionally good results have been realized with dispersed slips of flotation brightened kaolin. A process for the flotation brightening of kaolin clay is described in U.S. 2,990,958 to Ernest W. Greene et al. The clay slips to which this invention is applicable contain as a dispersing agent an alkali metal salt of a condensed phosphate in amount sufficient to fluidize a freshly prepared aqueous clay slip. Usually the clay dispersing agent is present in amount within the range of about 0.1 percent to 0.5 percent, especially about 0.2 to 0.4 percent, of the clay weight, on a moisture-free clay basis. (Moisture-free clay weight is determined by heating the clay to constant weight at 220° F.) Condensed phosphate clay dispersants include sodium hexametaphosphate, tetrasodium pyrophosphate, sodium tripolyphosphate and analogous potassium and ammonium compounds. Clay slips containing only water, kaolin clay and alkali metal condensed phosphate dispersant usually have a pH within the range of from about 5.5 to 6.5. Clay slips of this invention may also contain an alkali additive, such as sodium hydroxide or ammonium hydroxide in amount sufficient to adjust the pH of the slip to a suitable value, typically within the range of about 7.0 to 7.5. The addition of the base is desirable because condensed phosphate clay dispersants are generally more effective in neutral or moderately alkaline clay systems. The clay slips may also contain small amounts of germicides which also contribute to the stability of the slips. The use of substituted phenate germicides is disclosed and claimed in a copending application of E. W. Sawyer, Jr., Ser. No. 497,541, filed Oct. 18, 1965, now U.S. Patent No. 3,266,917. The use of 3,5-dimethyltetrahydro-1,3,5,2H-thiodiazine-2-thione as a germicide is disclosed and claimed in a copending application, Ser. No. 313,175, filed Oct. 2, 1963, now U. S. Patent No. 3,282,715.

The amino trimethyl phosphonic acid (or salt thereof) is preferably added to a previously prepared dispersed slip. It is preferable to add the amino trimethyl phosphonic acid as a solution in order to facilitate mixing. The use of an aqueous solution of the phosphonate or acid is recommended. The amino trimethyl phosphonic acid (or stoichiometric equivalent of phosphonate salt) is employed in amount within the range of 0.01 percent to 0.1 percent, preferably 0.02 percent to 0.05 percent, based on the moisture-free weight of the mineral. When used in amount appreciably less than 0.02 percent of the mineral weight, the stabilization may not be adequate. Economic considerations may preclude the use of appreciably more than 0.05 percent of amino trimethyl phosphonate. When amino trimethyl phosphonic acid is added to a condensed phosphate slip, salt formation occurs in situ. The number of hydrogen ions neutralized will depend upon the pH of the system.

It is also within the scope of this invention to spray dry mineral slurries which have been dispersed with a condensed phosphate salt and stabilized by incorporation of amino trimethyl phosphonic acid or salt thereof. In this case, the alkyl phosphonate may protect the condensed phosphonate from thermal degradation during spray drying. Further, the protective mechanism of the alkyl phosphonate still functions to stabilize the condensed phosphate when the spray dried material is reslurried in water. Paper-coating grades of kaolin clay are frequently supplied as a spray dried product. The use of alkyl phosphonates is of value in stabilizing the condensed phosphate in kaolin slips prior to spray drying, during drying and further stabilizes the spray dried product during storage and shipment. Moreover, the alkyl phosphonate stabilizes the slips resulting from the use of spray dried predispersed kaolin clays. The quantity of condensed phosphate dispersant and the quantity of phosphonate stabilizer used to prepare spray dried clay products are the same as the quantities that are useful in preparing slurried kaolin products of this invention, as described hereinabove.

The material employed in carrying out this invention is known to be an effective sequestering agent. However, the results of tests carried out with various well-known sequestering agents substituted for the amino trimethyl phosphonate showed that the desired stabilization of the condensed phosphate dispersant was not realized. This result was surprising and unexpected. Another reason why the beneficial effect of amino trimethyl phosphonate on the stability of condensed phosphate dispersed clay slurries was unexpected was that clay slurries dispersed with amino trimethyl phosphonate as the sole dispersant have poor stability. When aged, these slurries flocculate, thicken and become useless when the pH of the slurry drifts downward during storage.

The following example is given to illustrate the stabilization of high solids kaolin clay slips that results from adding a small amount of amino trimethyl phosphonic acid to condensed phosphate dispersed slips.

Two slips of a commercial paper-coating grade Georgia kaolin were prepared. Each slip contained 70 percent (70.0±0.1 percent) clay solids. One slip (Slip A) was dispersed by addition of tetrasodium pyrophosphate in amount of 0.30 percent of the moisture-free clay weight, as determined with a Cenco Moisture Balance. Slip B was similar to Slip A, with the exception that the dispersant was sodium hexametaphosphate employed in amount of 0.25 percent of the moisture-free clay weight. Each slip had the pH adjusted to about 7.5 by addition of sodium hydroxide and contained 3,5-dimethyltetrahydro-1,3,5,2H-thiadiazine-2-thione germicide in amount of 0.013 percent of the moisture-free clay weight. All slips were well dispersed and were prepared by laboratory techniques widely used in the paper-coating industry. When used, a commercial grade of amino trimethyl phosphonic acid was added prior to pH adjustment in the form of an aqueous solution of 50 percent concentration. After addition of the solution of stabilizer, the slips were agitated. Two dosages of stabilizer were used, i.e., 0.025 percent and 0.050 percent amino trimethyl phosphonic acid (calculated on the active content of the stabilizer solution and based on the moisture-free clay weight).

The slips with and without additive were compared for rheological stability after aging at room temperature and at an elevated temperature. Samples aged at ambient temperature were stored at room temperatures averaging about 80° F. in sealed ½ gallon glass containers. Tests at elevated temperature were carried out by placing samples in sealed ½ gallon glass containers in a Despatch oven maintained at 130° F. Each sample was opened weekly, stirred with a drill press mixer, the solids adjusted to 70.0 percent ±0.1 percent if necessary, and tested. The rheology of the slips was evaluated with a screening rate test, the results of which indicate with good reliability whether a slip can be screened during processing in a plant and whether the slip is sufficiently fluid to be mixed or pumped. In carrying out the screening test, 140 milliliter of slurry was poured on a 3-inch 150 mesh Tyler screen which was continuously vibrated. The time required to screen the slurry was recorded. Correlation of plant performance with results of this test for a large number of clay slips indicates that a slip requiring more than 300 seconds to pass through the screen under the conditions used is too viscous for practical use. Therefore, in testing, clay slips having screening rates in excess of 300 seconds were considered useless.

Results of the room temperature aging showed that the slurries without phosphonate stabilizer were useful after two months' aging although when amino trimethyl phosphonic acid was present, the screening rates after aging were lower than when the additive was absent. The results for the elevated temperature aging, summarized in table form, show that Slurry B, containing sodium hexametaphosphate dispersant, was especially unstable at elevated temperature. When amino trimethyl phosphonic acid was added to this slurry in amount of 0.050 percent of the clay weight, the useful life of the slurry was increased about eight-fold. The useful life of tetrasodium pyrophosphate dispersed slurry (Slurry A) was increased about three-fold by using 0.050 percent of the additive. Use of the additive in amount of 0.025 percent of the clay weight more than doubled the useful life of the condensed phosphate slurries.

EFFECT OF PRESENCE OF AMINO TRIMETHYL PHOSPHONATE ON STABILITY OF CONDENSED PHOSPHATE DISPERSED KAOLIN CLAY SLURRIES (70.0 PERCENT SOLIDS)

| Slurry | Amino Trimethyl Phosphonic Acid, wt. percent (percent based on clay solids) | Stability (days) (useful life at 130° F.) |
|---|---|---|
| A | None | 18 |
| A | 0.025 | 41 |
| A | 0.050 | 56 |
| B | None | 7 |
| B | 0.025 | 25 |
| B | 0.050 | 56 |

We claim:

1. A mineral composition in the form of a flowable dispersed aqueous slurry and comprising water, finely divided kaolin clay, an alkali metal salt of a condensed phosphate in dispersant-effective quantity and an alkali metal salt of amino trimethyl phosphonic acid in amount sufficient to lengthen the time span during which said slurry remains fluid when maintained at a temperature within the range of 70° F. to 130° F.

2. The composition of claim 1 in which said clay is a Georgia kaolin.

3. The composition of claim 1 in which said composition contains at least 65 percent clay solids.

4. The composition of claim 3 in which said condensed phosphate salt is tetrasodium pyrophosphate.

5. The composition of claim 4 in which said condensed phosphate salt is tetrasodium pyrophosphate employed in amount within the range of 0.1 percent to 0.5 percent of the moisture-free clay weight and said phosphonic acid salt is a sodium salt of amino trimethyl phosphonic acid present in amount within the range of about 0.01 percent to 0.1 percent of the clay weight.

6. The composition of claim 4 in which said condensed phosphate salt is tetrasodium pyrophosphate employed in amount within the range of 0.2 percent to 0.4 percent of the moisture-free clay weight and said phosphonate salt is a sodium salt of amino trimethyl phosphonic acid present in amount within the range of about 0.02 percent to 0.05 percent of the moisture-free clay weight.

7. The composition of claim 5 which has a pH within the range of 7.0 to 7.5.

8. The composition of claim 3 in which said condensed phosphate salt is sodium hexametaphosphate.

9. The composition of claim 8 in which said condensed phosphate salt is sodium hexametaphosphate employed in amount within the range of 0.1 percent to 0.5 percent of the moisture-free clay weight and said phosphonate salt is a sodium salt of amino trimethyl phosphonic acid present in amount within the range of about 0.01 percent to 0.1 percent of the moisture-free clay weight.

10. The composition of claim 8 in which said condensed phosphate salt is sodium hexametaphosphate employed in amount within the range of 0.1 percent to 0.4 percent of the moisture-free clay weight and said phosphonate salt is a sodium salt of amino trimethyl phosphonic acid present in amount within the range of about 0.02 percent to 0.05 percent of the moisture-free clay weight.

11. The composition of claim 8 which has a pH within the range of 7.0 to 7.5.

12. A spray dried product comprising kaolin clay, an alkali metal salt of a condensed phosphate in dispersant-effective amount and an alkali metal salt of amino trimethyl phosphonic acid in amount within the range of 0.01 percent to 0.1 percent of the moisture-free clay weight.

References Cited

UNITED STATES PATENTS

| 3,130,063 | 4/1964 | Millman et al. | 106—72 |
| 3,236,666 | 2/1966 | Sawyer | 106—72 |
| 3,266,917 | 8/1966 | Sawyer et al. | 106—72 |
| 3,282,715 | 11/1966 | Sawyer et al. | 106—72 |

TOBIAS E. LEVOW, *Primary Examiner.*

HELEN M. McCARTHY, *Examiner.*

J. E. POER, *Assistant Examiner.*